(12) United States Patent
Piccirillo (10) Patent No.: US 8,505,932 B1
(45) Date of Patent: Aug. 13, 2013

(54) BICYCLE HAULER

(76) Inventor: Dennis J. Piccirillo, Ridgway, PA (US)

( * ) Notice: Subject to any disclaimer, the term of this patent is extended or adjusted under 35 U.S.C. 154(b) by 113 days.

(21) Appl. No.: 13/214,804

(22) Filed: Aug. 22, 2011

Related U.S. Application Data (60) Provisional application No. 61/381,599, filed on Sep. 10, 2010.

(51) Int. Cl.
  *B62B 1/14* (2006.01)
  *B62B 5/06* (2006.01)

(52) U.S. Cl.
  USPC .............................. 280/30; 280/656; 280/769

(58) Field of Classification Search
  USPC .................... 280/30, 656, 762, 769, 43, 43.1, 280/79.11, 79.3
  See application file for complete search history.

(56) References Cited

U.S. PATENT DOCUMENTS

| | | | | |
|---|---|---|---|---|
| 2,803,349 | A | * | 8/1957 | Talbot .............................. 211/22 |
| 4,266,793 | A | * | 5/1981 | Pryor ............................. 280/204 |
| 4,728,244 | A | | 3/1988 | Stokkendal |
| 5,123,668 | A | | 6/1992 | Ligas |
| 5,454,577 | A | | 10/1995 | Bell |
| 5,579,972 | A | * | 12/1996 | Despain .......................... 224/506 |
| 5,853,189 | A | * | 12/1998 | Swartzlander ................ 280/652 |
| 5,887,879 | A | * | 3/1999 | Chumley ......................... 280/40 |
| 6,070,899 | A | * | 6/2000 | Gines ............................. 280/651 |
| 6,164,683 | A | * | 12/2000 | Kalman ......................... 280/656 |
| 6,471,104 | B1 | | 10/2002 | Janek |
| 6,491,195 | B1 | | 12/2002 | McLemore et al. |
| 6,846,017 | B2 | | 1/2005 | Martin |
| 6,884,018 | B1 | | 4/2005 | Dugan et al. |
| 6,910,609 | B2 | | 6/2005 | Williams et al. |
| 6,991,250 | B2 | | 1/2006 | Lindsey et al. |
| 2004/0080149 | A1 | * | 4/2004 | Martin .......................... 280/769 |
| 2005/0040613 | A1 | * | 2/2005 | Williams et al. ................ 280/30 |
| 2008/0099522 | A1 | | 5/2008 | Clausen et al. |
| 2008/0150253 | A1 | | 6/2008 | Crawford et al. |
| 2008/0240897 | A1 | | 10/2008 | Miro et al. |
| 2010/0066069 | A1 | * | 3/2010 | Bradshaw ..................... 280/769 |

FOREIGN PATENT DOCUMENTS

EP 68436 A2 1/1983

* cited by examiner

*Primary Examiner* — Frank Vanaman
(74) *Attorney, Agent, or Firm* — Stephen Ross Green; Lee Kim (57) ABSTRACT

A bicycle hauler that can be used to transport bicycles with a motor vehicle, towed behind a bicycle, or pulled over the ground by hand is disclosed. Hitch arm and brackets secure at least one or a plurality of bicycles in the bicycle hauler together with a plurality of tire channels. When the bicycle hauler wheels are placed in the upper position, the wheels do not contact the ground and the bicycle hauler can be attached to a motor vehicle for transport. When the bicycle hauler wheels are placed in the lower position and the wheels do contact the ground and the hitch arm is rotated to its forward position, the bicycle hauler can be towed behind a bicycle. The bicycle hauler can also be manually pulled over the ground by grasping first and second bicycle brackets and using said first and said second bicycle brackets as handles.

7 Claims, 12 Drawing Sheets

BICYCLE HAULER

CROSS REFERENCE TO RELATED APPLICATION

This application claims the benefit of an earlier-filed U.S. Provisional Patent Application, entitled "Bicycle Hauler" having Ser. No. 61/381,599, filed Sep. 10, 2010, said U.S. Provisional Patent Application hereby fully incorporated by reference.

BACKGROUND OF THE INVENTION

1. Field of the Invention

This invention relates to a device having multiple configurations which can be used to (a) transport one or more bicycles by securing the device to a motor vehicle; (b) in a further embodiment, transport cargo over the ground by attaching the device to the seat post of a bicycle so that the device can be towed behind the bicycle; and (c) in yet another embodiment, transport one or more bicycles or other cargo over the ground by manually pulling the device along on its wheels. The wheels of the device can be secured in upward or downward positions so they can contact or not contact the ground, depending on the desired configuration.

2. Description of the Related Art

Bicycling is a popular recreation, and the increasing availability of "bike trails" is an indication of this. Frequently, bicycles are taken on camping trips and are either ridden to the campsite or are transported to the campsite by motor vehicle. If ridden to the campsite, some arrangement must be made to transport the other camping equipment to the site.

One of the difficulties presented to bicycle enthusiasts is the transport of one or more bicycles to the origin of the bike trail or campsite. The prior art discloses numerous types of carriers that can be attached to the back of a motor vehicle for that purpose. Examples would be U.S. Pat. No. 6,491,495 to McLemore and U.S. Patent Publication Number US 2008/0099522 by Clausen et al., U.S. Pat. No. 6,884,018 to Dugan et al., and U.S. Patent Publication Number US 208/0240897 by Miro et al., which can be attached to a motor vehicle and can transport multiple bicycles or even a motorcycle. They appear to have been designed for that purpose alone, and do not appear to be adaptable to transport equipment when detached from the vehicle.

Other devices are useful for transporting cargo over land can be pulled or towed by hand, but require additional components to be secured to a motor vehicle. For example, U.S. Pat. No. 6,991,250 to Lindsey discloses a convertible vehicle which can be modified into various configurations. With the addition of a separate component, a "bike rack accessory", the device can be secured to a motor vehicle and carry one or more bicycles. The device does not appear to be self contained, and the "bike rack accessory" is necessary to adapt the device for configuration into a bicycle carrier.

U.S. Pat. No. 6,910,609 to Williams et al. discloses a carrier for transporting equipment such as bicycles. The carrier is depicted as a having "clam shell" type of configuration and is towed behind a vehicle. While multiple embodiments of the device are described, it appears that they require the use of separate components to achieve each of the desired configurations.

U.S. Pat. No. 6,471,104 to Janek discloses a wheeled container which can be de-mounted from a carrier on a motor vehicle and moved by hand over a smooth surface. The relatively small fixed wheels disclosed on the various drawings resemble casters, and might present a difficulty if the device is used over rough ground.

U.S. Pat. No. 6,846,017 to Martin discloses a cargo carrier which includes removable wheels and can be rotated to receive cargo similar to a hand truck, and subsequently fixed in a horizontal position to hold cargo for transport. It lacks, however, the ability to be towed behind a bicycle.

U.S. Pat. No. 5,454,577 to Bell and U.S. Pat. No. 5,123,668 to Ligas disclose two devices for towing behind a bicycle. The Ligas device can be converted to a stroller. Neither appears to be adaptable to carry a bicycle when secured to a motor vehicle.

As may be seen, while the above examples from the prior art show some of the features of the invention disclosed herein, none of them show all of the features disclosed in combination, and some require the use of additional components or structures to accomplish more than one function or mode of use.

The invention disclosed herein addresses the shortcomings in the prior art and provides other features and facets not found therein.

BRIEF SUMMARY OF THE INVENTION

This invention is directed to a bicycle carrier or hauler having multiple configurations in a self contained structure.

It includes a rectangular shaped frame having two wheels that can be secured in an upward or downward position. A roughly "L" shaped hitch arm is pivotally mounted in the frame and can be secured to the front of the frame in a forward position for attaching to and being towed by a bicycle or for manually towing the device over the ground, or in a lowered position in which it can hold one or more bicycles in channels in the frame and the device can then be attached to a motor vehicle. The device is provided with two wheels which are depicted in the drawings as smaller than bicycle tires, but larger than small caster type wheels, and are thus better suited for uneven terrain. Furthermore, they are removably secured to the frame and can readily be mounted in an upward position when the device is attached to a vehicle or in a downward position, when the device is towed by hand or behind a bicycle over the ground.

In one representative embodiment, when the hitch arm is secured in its lowered position, one or more bicycles can be restrained in channels within the frame by one or more adjustable brackets movably attached to the hitch arm. The wheels of the device, having been secured in their upward positions, no longer contact the ground, and the device can be mounted to a corresponding hitch receiver on a motor vehicle for transport.

In another embodiment, when a destination such as a campsite is reached, the bicycles can be removed from the device, the wheels remounted in their downward positions, and the device removed from the motor vehicle. In their downward positions, the wheels are in contact with the ground and carry the weight of the device and any equipment or cargo placed into it. The device can then be attached to and towed behind the very same bicycle that it previously carried and transported.

In yet a further embodiment, the brackets, which previously retained the bicycle or bicycles in the channels of the device when it was attached to a motor vehicle, can also be used as handles to manually tow the device on its wheels when they are placed in their downward position.

LISTING OF REFERENCE NUMERALS

Whenever possible, the same reference numerals are used in the various Figures of the drawings to refer to the same or corresponding parts throughout those Figures.

1 bicycle hauler
2 bicycle
4 frame
5 first side
6 second side
7 front of frame
8 bottom of frame
9 mesh
11 first wheel
12 second wheel
16 first wheel support
17 second wheel support
18 first support holes
19 second support holes
21 first wheel slide
22 second wheel slide
26 first pin
27 second pin
28 tire channels
31 hitch arm
32 hitch arm pivot
33 threaded locking knob
36 front internal threaded portion
37 bottom internal threaded portion
43 first bracket
44 second bracket
46*a* and 46*b* first and second adjustment knobs
47 coupler
48*a* and 48*b* coupler holes
49 vehicle
51 frame receiver
52 frame receiver hole
54 vehicle receiver
55 vehicle receiver hole
56 pin
61 bicycle seat clamp
62 bolt
64 flexible joint
68 ball joint connector
70 bore
73 hole

DETAILED DESCRIPTION

Figure 1:
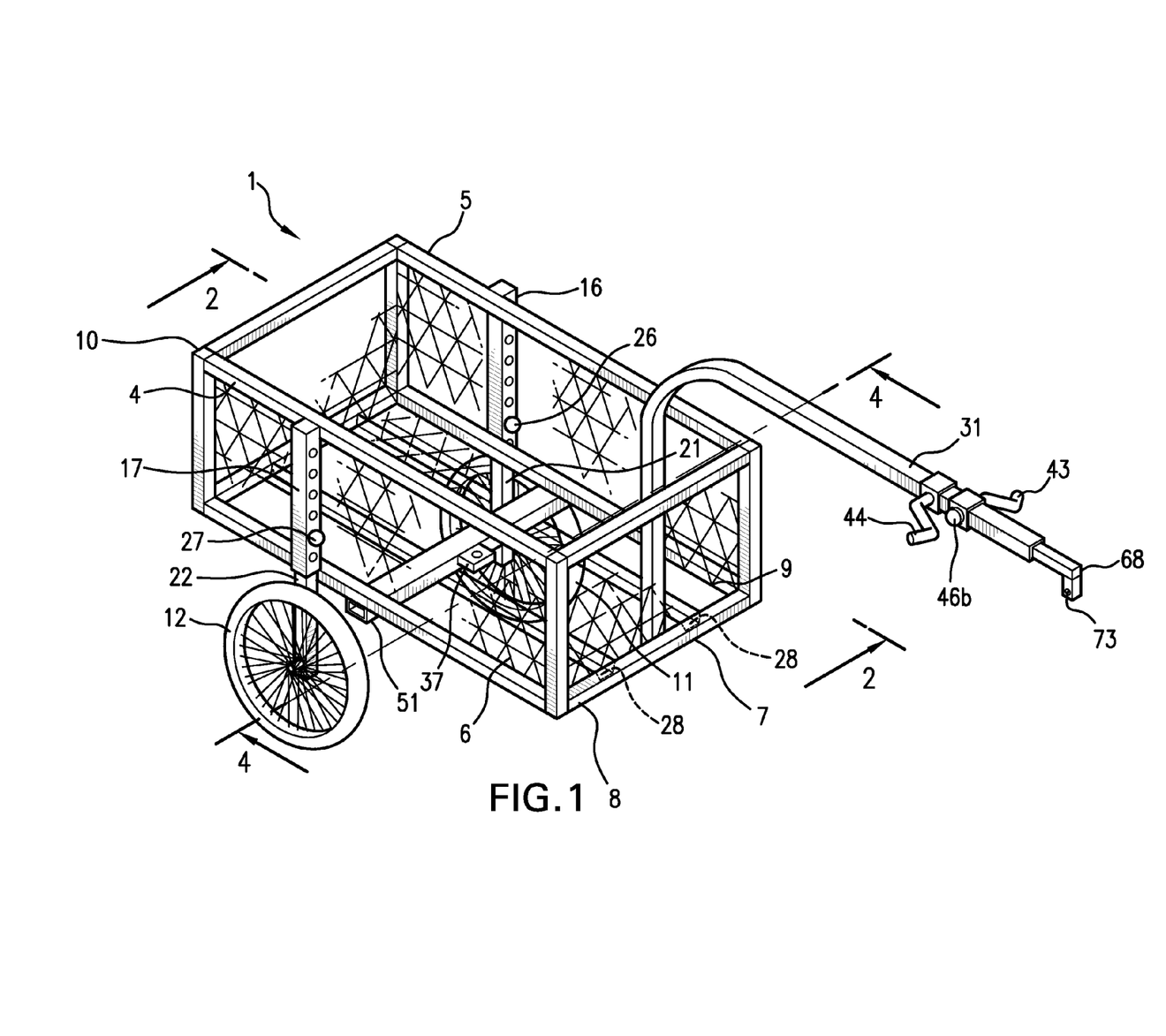
FIG. 1 illustrates an isometric view of an exemplarily exemplary embodiment of a bicycle hauler.
Figure 2:
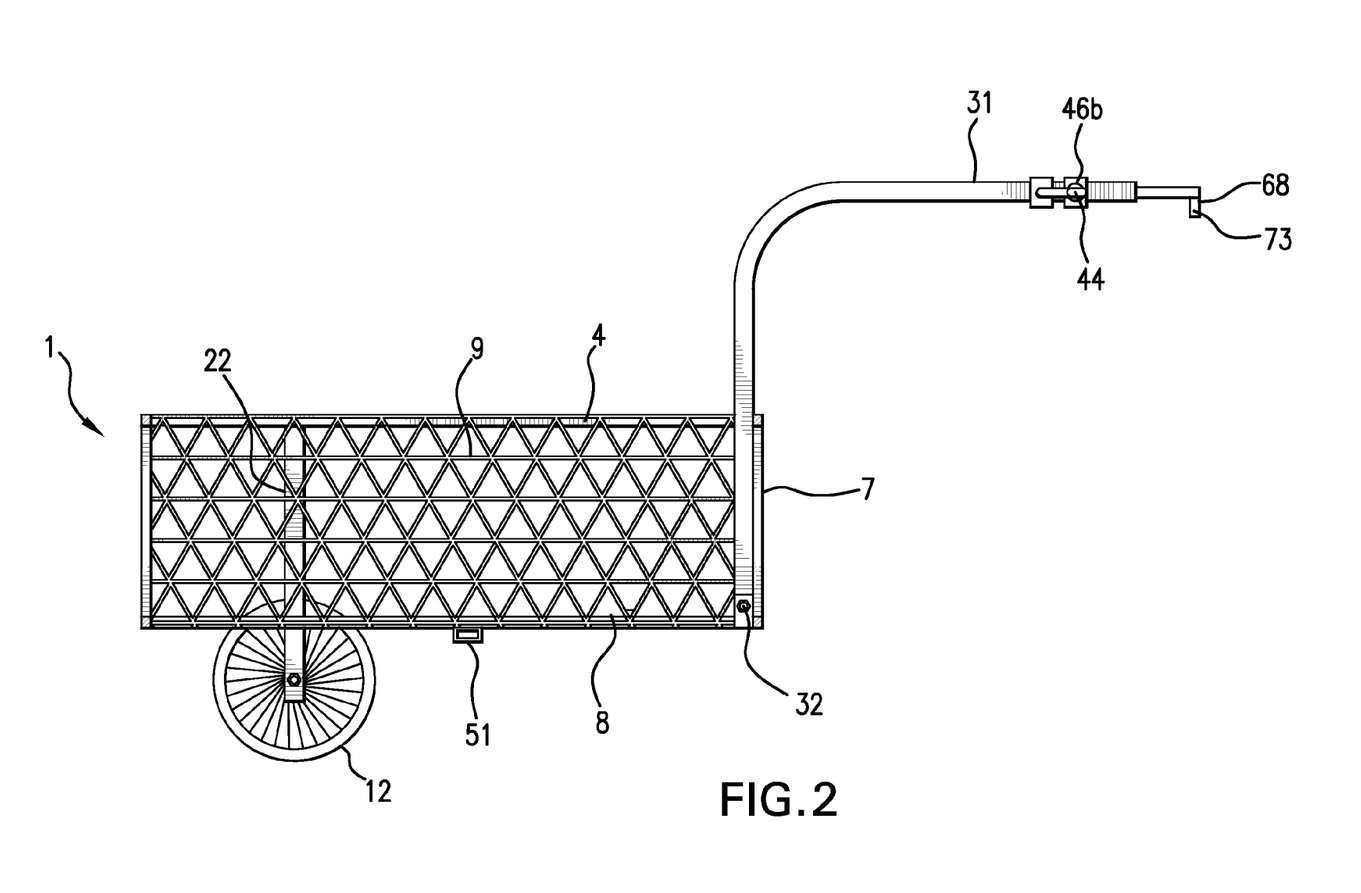
FIG. 2 illustrates a side view of a bicycle hauler through section 2-2 as shown on FIG. 1 without a bicycle stored therein, but configured so as to be towable by a bicycle (not shown).

As shown in FIG. 1, a bicycle hauler 1 may be used to transport bicycles with a motor vehicle (also referred to herein as a "vehicle"). FIG. 1 shows, in isometric view, a bicycle hauler 1 which is comprised of frame 4 and a wire mesh 9. Frame 4 has a front portion 7, a bottom portion 8, and first side 5 and second side 6.

In one embodiment bicycle hauler 1 can be supported on the ground by two wheels, first wheel 11 and second wheel 12, which may be seen on FIG. 1. Referring now to FIG. 1 and also to FIGS. 8 and 9, first wheel 11 is secured to first wheel slide 21, and second wheel 12 is secured to second wheel slide 22. First wheel slide 21 and second wheel slide 22 are depicted as being rectangular in cross section and are slidably disposed within first wheel support 16 and second wheel support 17, respectively. However, it should be understood that other cross sections for these elements might be used as well, so long as first and second wheel slides 21 and 22 are slidable within their corresponding first and second wheel supports 16 and 17.

Referring to FIGS. 1, 7, 8, and 9, first wheel support 16 is secured to first side 5 of frame 4 and second wheel support 17 is secured to second side 6 of frame 4. First wheel support 16 is shown as having a plurality of holes 18, and second wheel support 17 is shown as having a plurality of holes 19. Holes 18 and 19 can be aligned with corresponding holes in first wheel support 16 and second wheel support 17 (only hole 24 in second slide 22 is shown for purposes of clarity) so that first slide 21 and second slide 22 can be secured in upper or lower positions within first wheel support 16 and second wheel support 17 by using first pin 26 and second pin 27. Frame 4 also includes a frame receiver 51 which will be discussed in greater detail and allows bicycle hauler 1 to be secured to a motor vehicle for transport.

Figure 8:
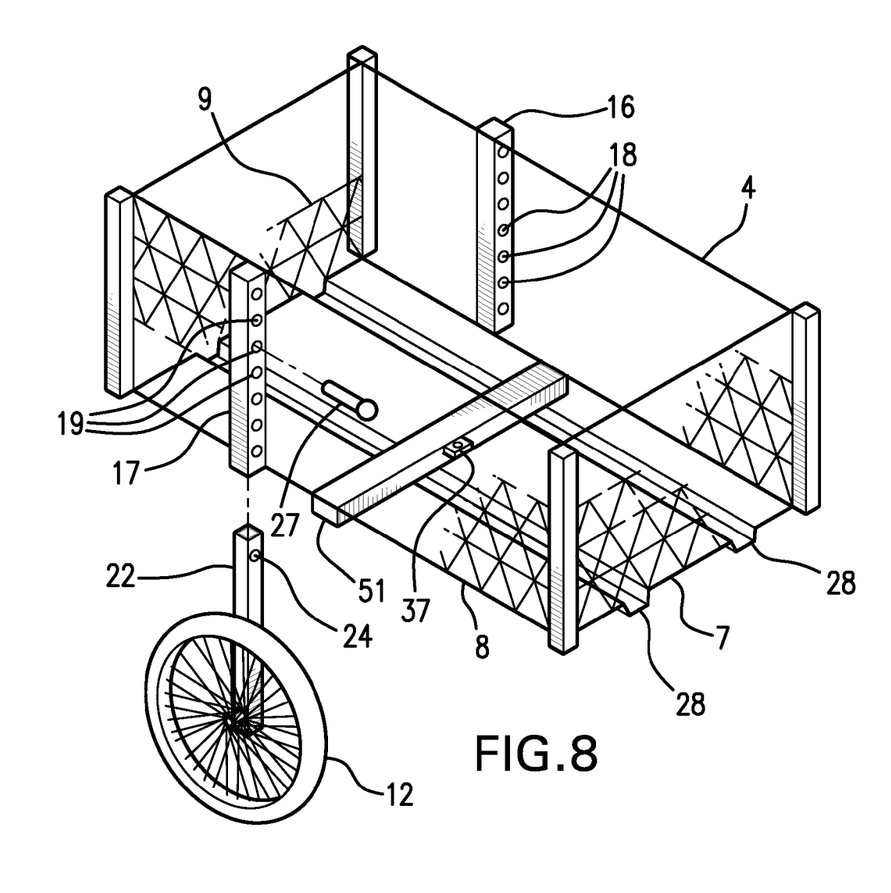
FIG. 8 illustrates an isometric partially exploded view of a bicycle hauler showing how its wheels can be secured in a lower position in preparation for towing behind a bicycle.
Figure 9:
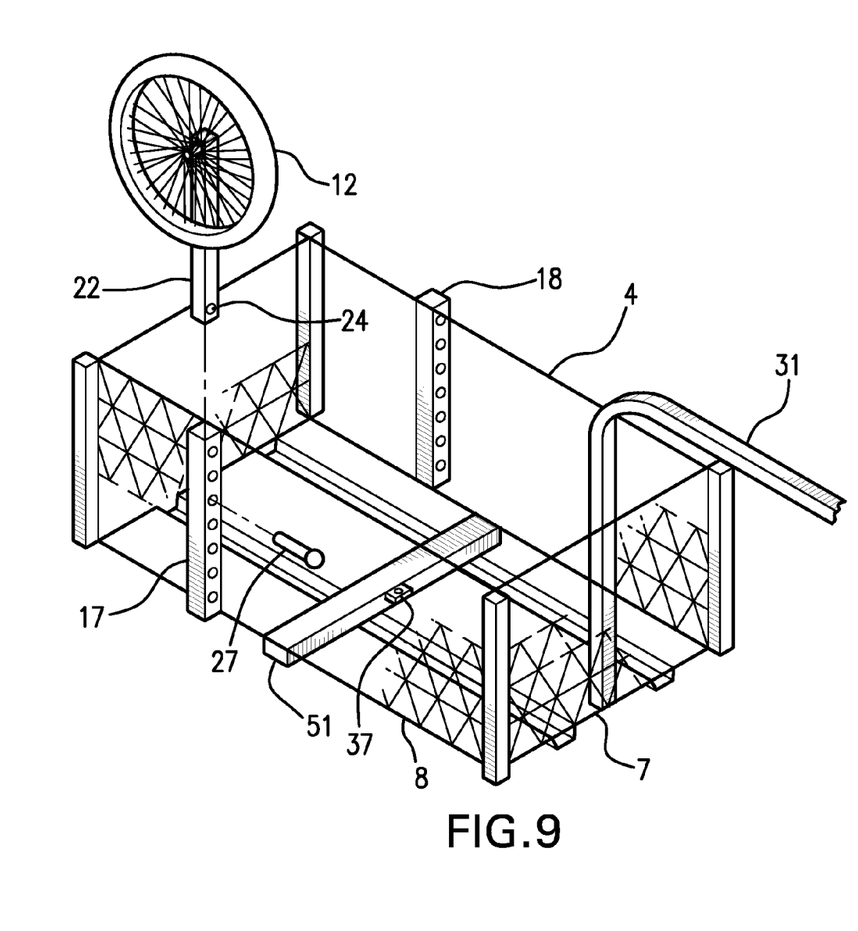
FIG. 9 illustrates an isometric partially exploded view of a bicycle hauler showing how its wheels can be stored in an upper position prior to being secured to a vehicle.

Still referring to FIGS. 1, 8, and 9, first wheel 11 and second wheel 12 and their respective first and second slides 21 and 22 can also be secured within first wheel support 16 and second wheel support 17 using first pin 26 and on first side 5 and second pin 27 on second side 6, so that first wheel 11 and second wheel 12 can be retained in a generally upward (i.e., non-ground contacting) orientation when bicycle hauler is secured to a vehicle for transport in one embodiment, and in a generally downward (i.e., ground contacting) direction when bicycle hauler 1 is being towed behind a bicycle in a related embodiment.

Figure 4:
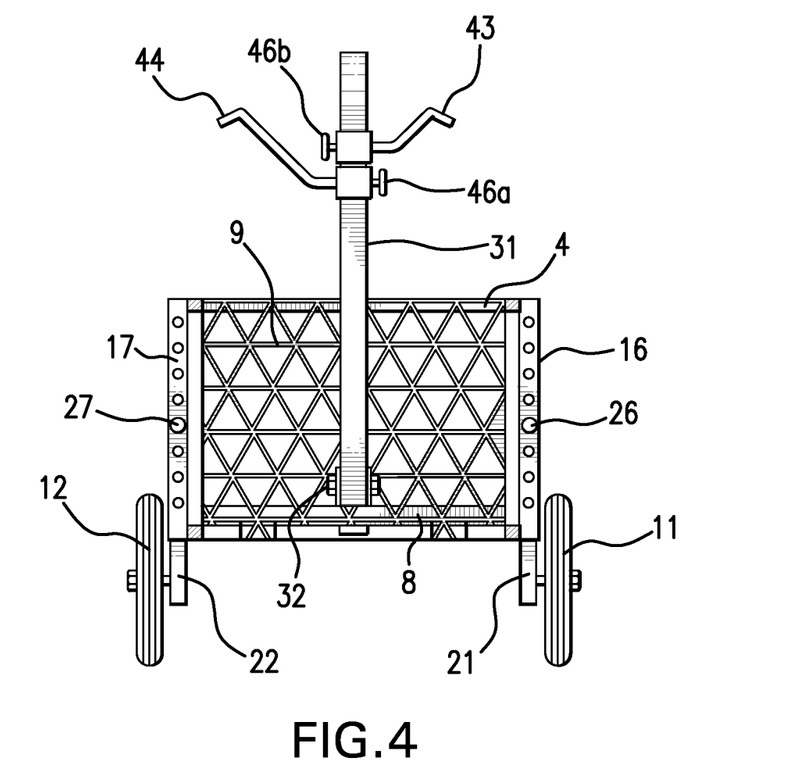
FIG. 4 illustrates a frontal view of a bicycle hauler taken through sectional lines 4-4 shown on FIG. 1.
Figure 5:
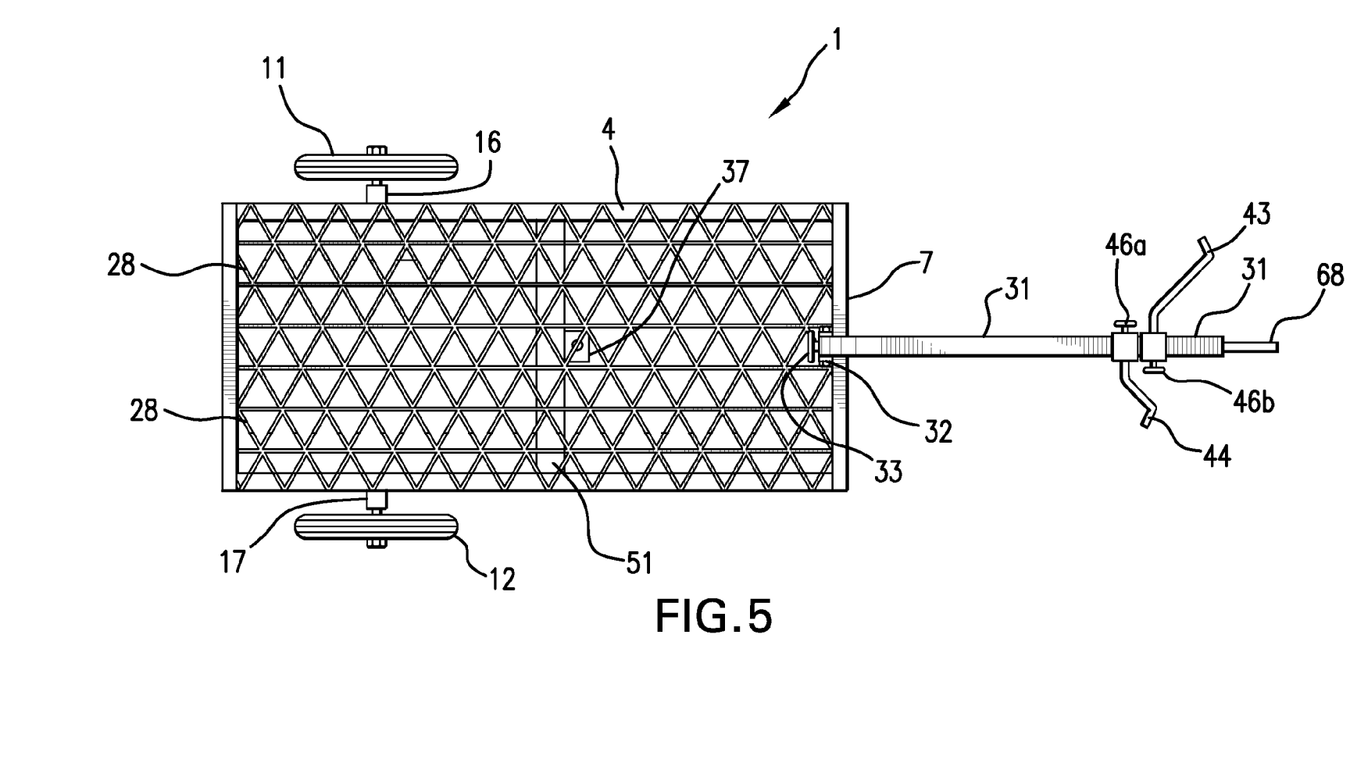
FIG. 5 illustrates a top view of a bicycle hauler.

In one embodiment, as shown in FIG. 8, frame 4 is provided with at least one or a plurality of tire channels 28. Each tire channel 28 is configured so as to be able to lightly grip the tires of a bicycle (not shown). In this embodiment, as depicted in FIGS. 1, 4, and 5, frame 4 includes two tire channels 28, and these are illustrated as being integrally formed in mesh 9 on bottom portion 8 of frame 4. Those skilled in the art will also recognize that channels 28 can also be fabricated as separate elements and secured to bottom 8 of frame 4.

Referring now to FIGS. 1, 2, 3, and 4, hitch arm 31 is a depicted as a roughly "L" shaped member and is pivotally mounted at one of its ends to frame 4 on a transverse axis at the bottom of frame 4 by hitch arm pivot 32. In this embodiment, as may be seen by additionally referring to FIG. 10, hitch arm 31 can be moved and secured into a forward position against front threaded portion 36 of front portion 7 of frame 4 by threaded locking knob 33 so that bicycle hauler 1 can then be attached to a bicycle, as will be discussed in one embodiment. In yet another embodiment, hitch arm 31 can be moved rearward and secured in a lowered position against bottom threaded portion 37 of bottom 8 of frame 4 by threaded locking knob 33 as may be seen by additionally referring to FIG. 11, so that it can secure one or more bicycles when it is attached to a motor vehicle, as will also be discussed, in another embodiment.

Figure 10:
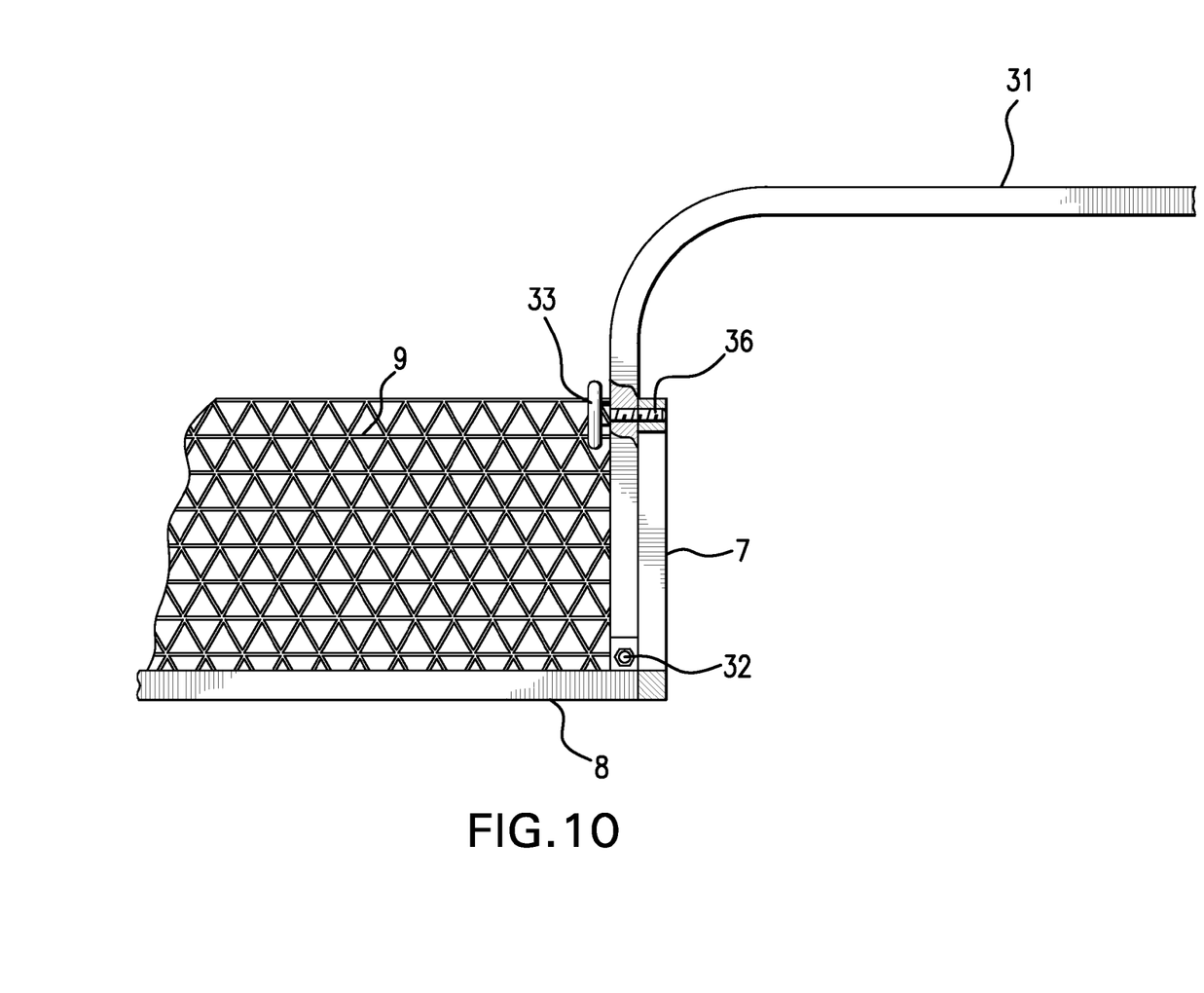
FIG. 10 illustrates a detail view of a front of a bicycle hauler with a portion of the mesh removed showing the manner in which a hitch arm is secured to the front portion of the bicycle hauler in preparation for towing behind a bicycle.
Figure 11:
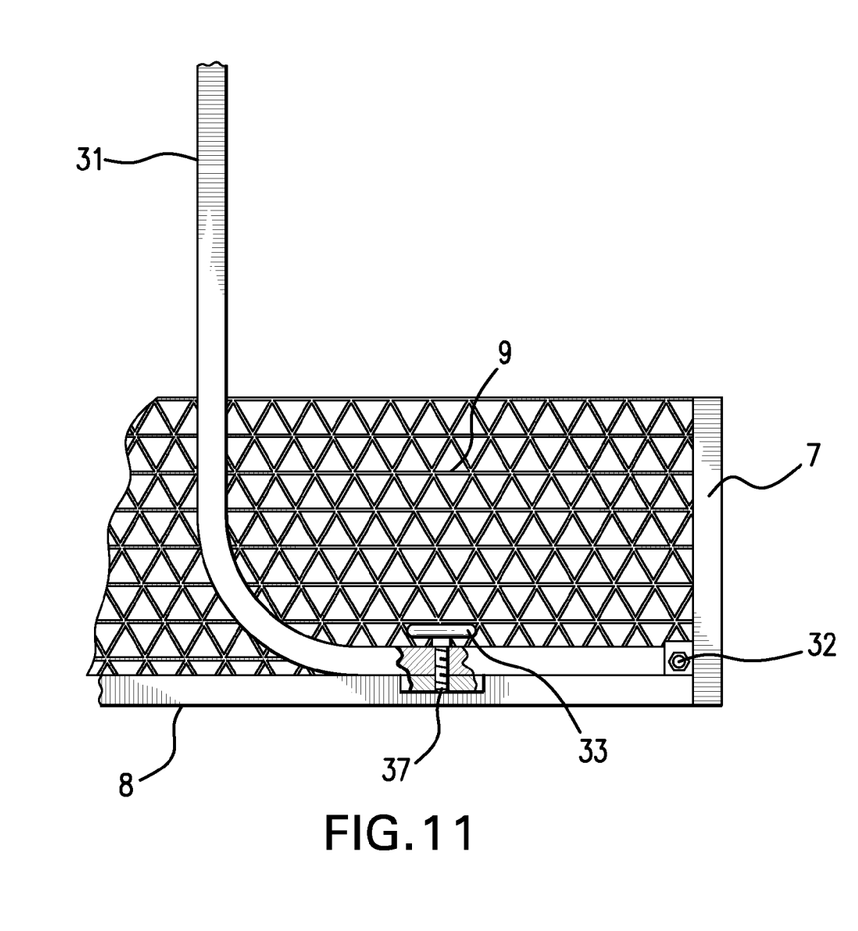
FIG. 11 illustrates a detail view of a bicycle hauler with a portion of the mesh removed to show the hitch arm secured to the bottom of the bicycle hauler in preparation for securing the bicycle hauler to a vehicle for transport.

As may be seen in FIG. 10, when hitch arm 31 is secured in a forward position, threaded locking knob 33 extends through hitch arm 31 and engages a front threaded portion 36 of frame 4. Conversely, as may be seen in FIG. 11, when hitch arm 31 is secured in a lowered position, threaded knob 33 extends through hitch arm 31 and engages bottom internal threaded portion 37 of frame 4.

Figure 3:
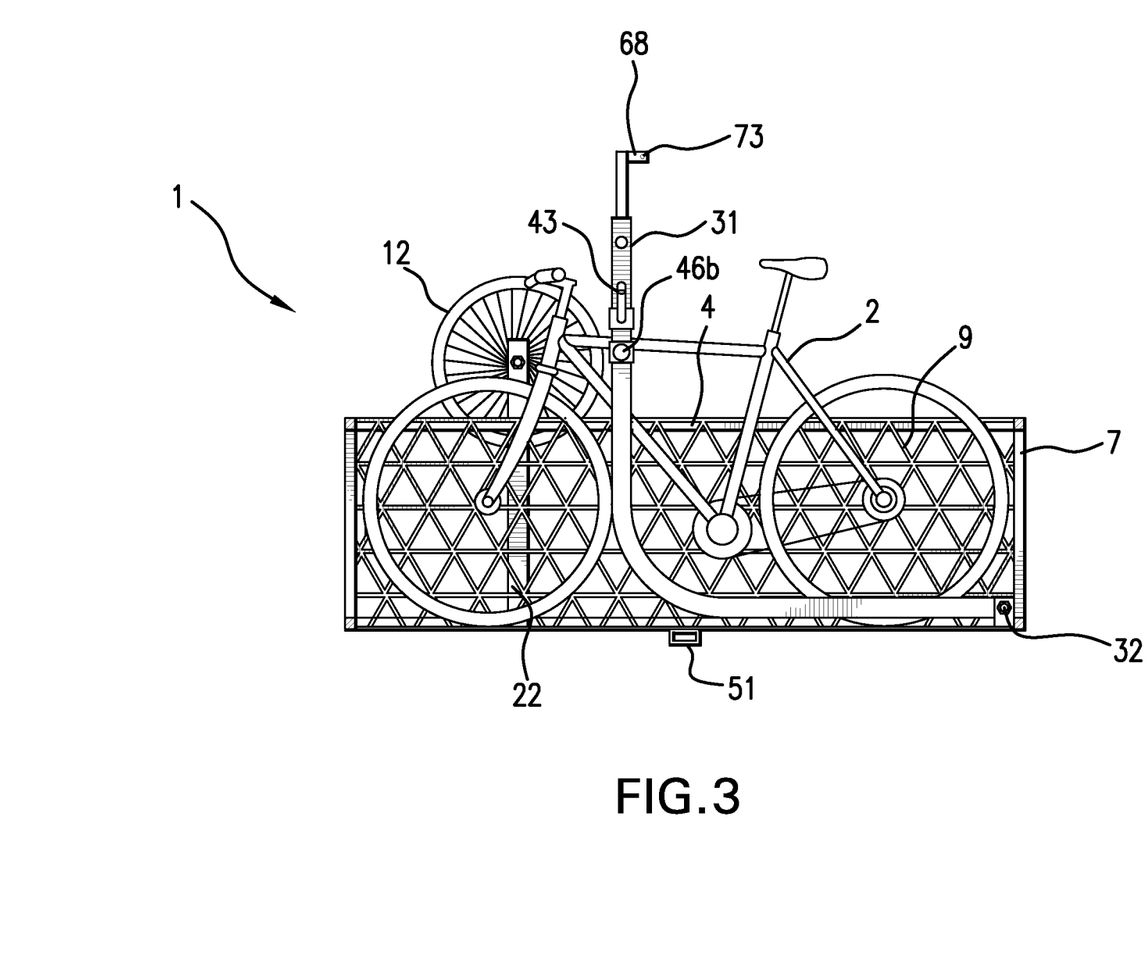
FIG. 3 illustrates a side view of a bicycle hauler through section 2-2 of FIG. 1 showing a bicycle secured therein, prior to being secured to a vehicle for transport.
Figure 6:
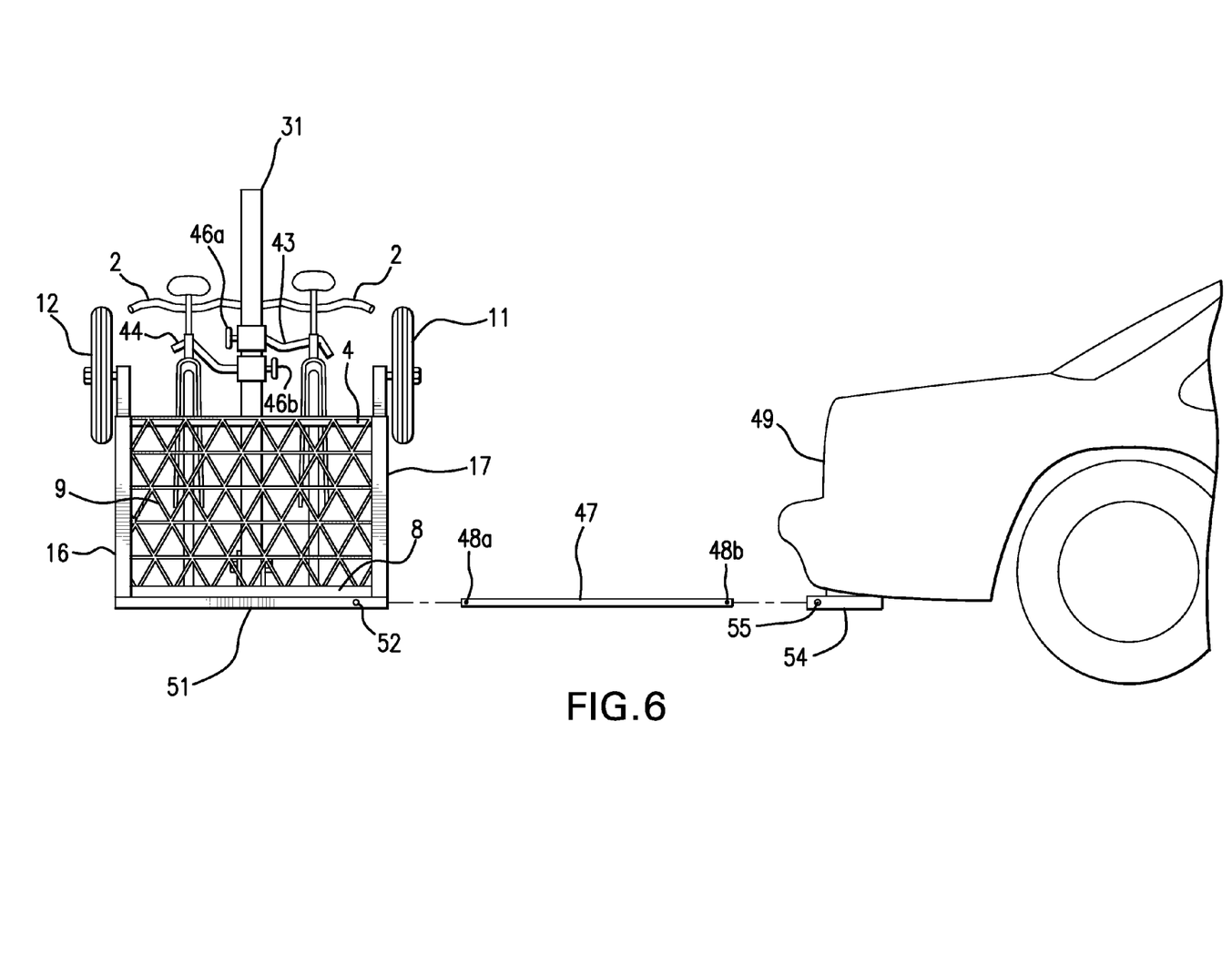
FIG. 6 illustrates an elevation view of a bicycle hauler and its attaching apparatus in exploded form illustrating how it can be secured to a vehicle.

Still referring to FIGS. 1, 2, 3, and 4, as well as FIGS. 5 and 6, hitch arm 31 also includes a first bracket 43 and a second bracket 44. First bracket 43 and second bracket 44 are slidably disposed along hitch arm 31 in the general area of another end of hitch arm 31, and can be secured in various positions by tightening the respective adjustment knobs 46a and 46b of first bracket 43 and second bracket 44. First and second brackets 43 and 44 are configured so as to be able to grip or otherwise retain a part of a bicycle placed in bicycle hauler 1 in cooperation with tire channels 28 as illustrated in FIG. 3. In this configuration, bicycle hauler 1 can be attached to a motor vehicle for transport.

Referring now to FIGS. 3 and 6, a bicycle 2 has been placed in bicycle hauler 1 and is held in place by second bracket 44 and tire channel 28, second bracket 44 being positioned so as to hold bicycle 2 against tire channel 28, and adjustment knob 46a having been tightened so as to grip or otherwise retain second bracket 44 and thus bicycle 2 in position.

Preparing bicycle hauler 1 for attachment to a motor vehicle can be understood by referring FIGS. 3, 6, 7, and 9. If first wheel 11 and second wheel 12 are in their downward (i.e., ground contacting) position, first wheel slide 21 (as depicted in FIG. 1) and second wheel slide 22 can be removed from first wheel support 16 and second wheel support 17, which can easily be done by removing first pin 26 and second pin 27. Once reoriented into their upward (i.e., non-ground contacting) positions, first and second wheels 11 and 12 and first wheel slide 21 (as depicted in FIG. 1) and second wheel slide 22 can then be re-secured in their upward position in first wheel support 16 (as depicted in FIG. 4) and second wheel support 17 again by inserting first pin 26 (as depicted in FIG. 4) and second pin 27 into the corresponding holes 18 and 19 to engage hole 24 of second slide 22 and the corresponding hole (not illustrated) in first slide 21.

Once this has been done, one or more bicycles 2 can be placed into bicycle hauler 1 (as referenced in FIGS. 1, 3, and 5). Referring first to FIG. 3, a bicycle 2 has been secured within bicycle hauler 1 as was previously described. FIG. 6 illustrates two bicycles 2 placed in bicycle hauler 1, and first and second wheels 11 and 12 secured in upward positions for transport. Hitch arm 31 has been rotated rearward within frame 4, and has been secured in its lower position by threaded locking knob 33 and bottom threaded portion 37, in the manner shown in FIG. 11, as was previously described. First bracket 43 and second bracket 44 have been adjusted using first and second adjusting knobs 46a and 46b so as to grip or otherwise retain bicycles 2 as may be better seen by referring to FIGS. 3, 6, and 9.

Figure 7:
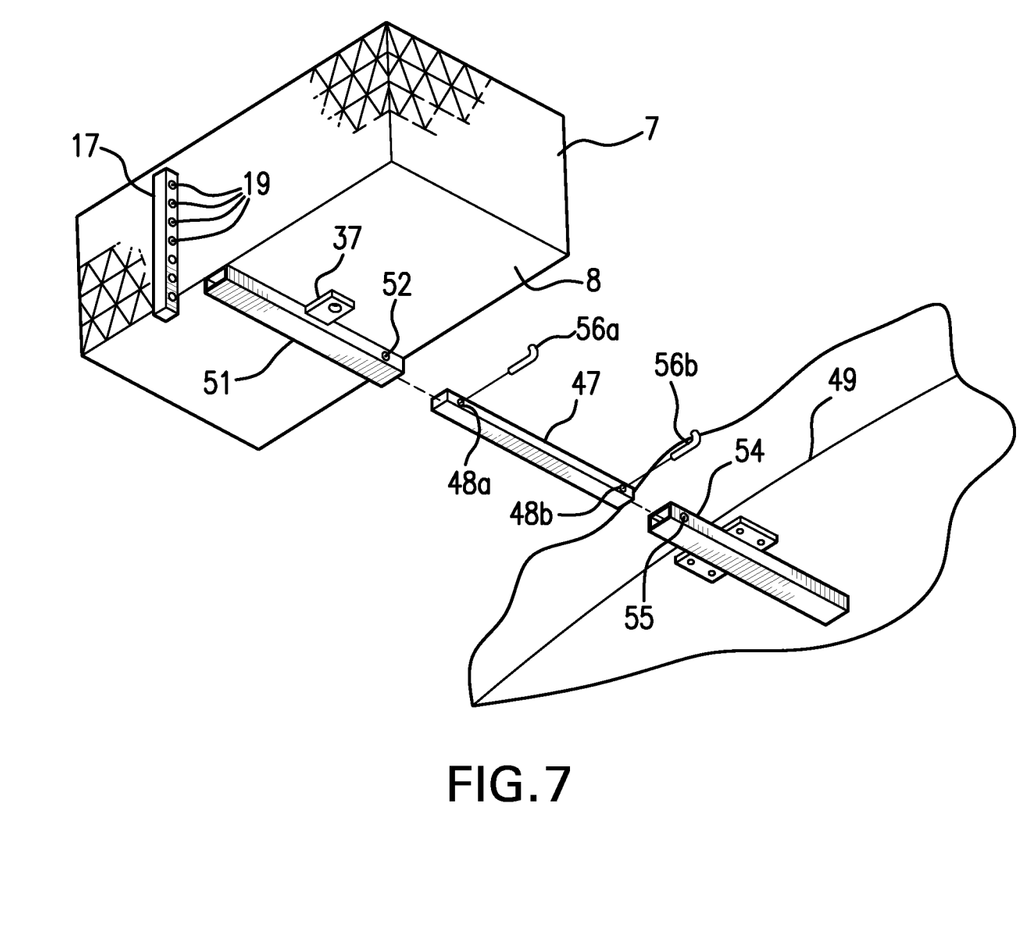
FIG. 7 illustrates an isometric view of a bicycle hauler in exploded form demonstrating how it can be secured to a vehicle.

Referring now to FIGS. 6 and 7, bicycle hauler 1 and the bicycles 2 secured therein may now be attached to a motor vehicle, illustrated generally by reference numeral 49, for transport. Coupler 47 is inserted into frame receiver 51 which is secured to frame 4. Coupler 47 is also inserted in vehicle receiver 54, which has been previously secured to vehicle 49 as illustrated in FIGS. 6 and 7. Frame receiver 51 includes receiver hole 52 and vehicle receiver 54 includes receiver hole 55. Coupler 47 has holes 48a and 48b in the general vicinity of its two ends. Hole 48a can be aligned with receiver hole 52 and hole 48b can be aligned with a hole 55 in vehicle receiver 54. At that point, coupler 47 can be locked into position with respect to frame receiver 51 and vehicle receiver 54 by inserting pins 56a and 56b into holes 48a and 52 and holes 48b and 55, respectively, thereby securing bicycle hauler 1 to vehicle 49.

Once a destination has been reached, in yet another related embodiment, bicycle hauler 1 can be reconfigured so as to be towable behind bicycle 2. To accomplish this, bicycle hauler 1 is removed from vehicle 49 by reversing the steps previously described. Referring to FIG. 8, first wheel 11 (as depicted in FIG. 6) and second wheel 12 of their corresponding first wheel slide 21 (as depicted in FIG. 1) and second wheel slide 22 can be inserted in their respective downward (i.e., ground contacting) positions within first wheel support 16 and second wheel support 17, respectively. After bicycle 2 has been released from first and second bicycle brackets 43 and 44 and bicycle 2 has been removed from bicycle hauler 1, hitch arm 31 can be rotated forward and secured to front portion 7 of frame 4 by threaded locking knob 33 and front internal threaded portion 36, in the manner shown in FIG. 10.

Figure 12:
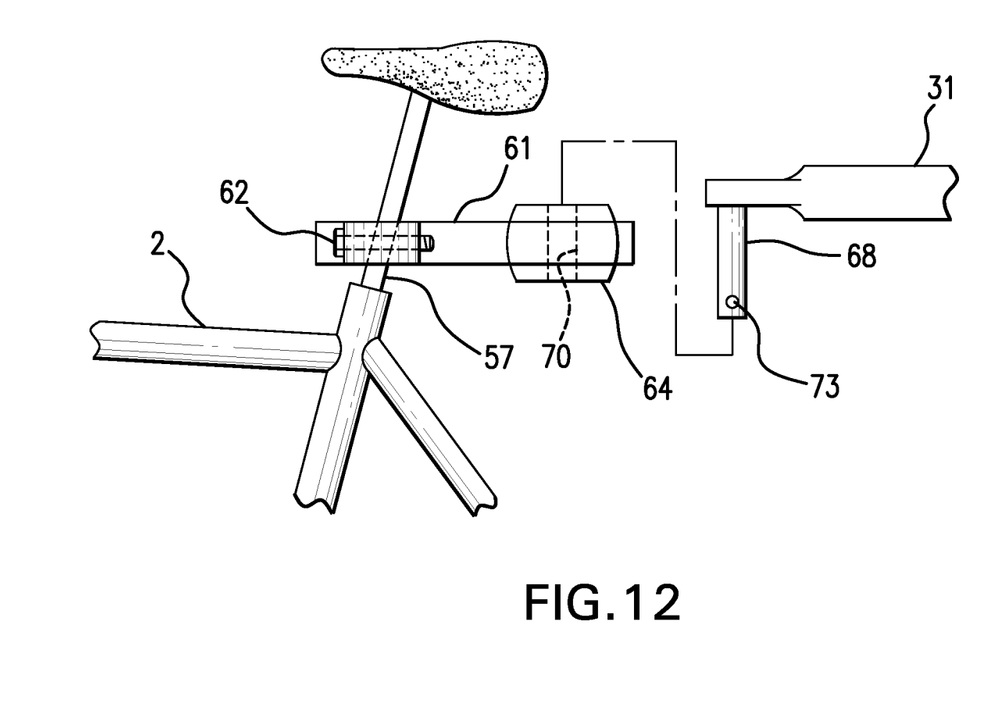
FIG. 12 illustrates a detail view showing a bicycle seat clamp and flexible joint for securing a bicycle hauler to a bicycle.

Bicycle hauler 1 can then be attached to a bicycle 2. Referring to FIG. 12, bicycle seat clamp 61 is secured to bicycle seat post 57 by tightening bolt 62. Bicycle seat clamp 61 is also provided with flexible joint 64 which is partially rotatable within bicycle seat clamp 61. Flexible joint 64 is depicted as a ball joint, but those skilled in the art will recognize that flexible joint 64 can have several configurations, any of which will allow the relative movement of hitch arm 31 and bicycle 2 (as referenced in FIG. 6). Flexible joint 64 has bore 70 into which joint connector 68 can be inserted. Joint connector 68 is secured to an end of hitch arm 31 opposite from hitch arm pivot 32 (as referenced in FIG. 11). When joint connector 68 has been inserted into bore 70, a pin or clip (not shown) can be inserted into hole 73 in flexible joint connector 68 to secure hitch arm 31 to bicycle 2 so that bicycle hauler 1 is thus towable behind bicycle 2.

It should also be noted that in another embodiment, bicycle hauler 1 can be manually pulled rather than towed by a bicycle 2. Referring to FIGS. 1 and 5, when hitch arm 31 has been rotated forward and secured to front portion 7 of frame 4 with threaded locking knob 33 and front internal threaded portion 36, as was illustrated in FIG. 10, and when first wheel 11 and second wheel 12 of their corresponding first wheel slide 21 and second wheel slide 22 have been inserted in their respective downward (i.e., ground contacting) positions within first wheel support 16 and second wheel support 17, respectively, bicycle hauler 1 can be manually pulled over the ground by grasping first and second bicycle brackets 43 and 44 and using said first and second bicycle brackets 43 and 44 as handles.

What is claimed is:

1. A bicycle hauler comprising:
   (a) a frame having a front, a bottom, a first side, and a second side;
   (b) channel means in said bottom of said frame for engaging at least one tire of a bicycle;
   (c) a first wheel and a second wheel which can be oriented in upward or downward positions, said first and second wheels being temporarily securable to said first side and said second side respectively in either position, said first and second wheels being able to contact a ground surface when placed in said downward position;
   (d) a hitch arm, pivotally mounted to said frame at an end, said hitch arm being securable in either a forward position or a lowered position, said hitch arm having gripping means adjustably securable to said hitch arm at another end for retaining a bicycle within said channel means when said hitch arm is in said lowered position;
   (e) coupling means secured to said frame for removably attaching said bicycle hauler to a motor vehicle; and
   (f) attaching means secured to said hitch arm in proximity to said gripping means for removably attaching said bicycle hauler to a bicycle when said hitch arm is in said forward position and said first and second wheels are in said downward position.

2. The bicycle hauler of claim 1 wherein said channel means comprises a plurality of distinct channels.

3. The bicycle hauler of claim 2 wherein said gripping means comprises at least one adjustable bracket.

4. A bicycle hauler comprising:
   (a) a frame having a front, a bottom, a first side, and a second side;
   (b) at least one channel in said bottom of said frame for engaging at least one tire of a bicycle;
   (c) a first wheel and a second wheel slidably securable at said first side and said second side of said frame in upward or downward positions, said first and second wheels being able to contact a ground surface in said downward position;
   (d) a hitch arm pivotally mounted at one of its ends to said front of said frame such that said hitch arm is rotatable into either a forward position or a lowered position, said hitch arm further having at least one bracket adjustably securable to said hitch arm at another end, said bracket being able to retain said bicycle tire within said at least one channel when said hitch arm is in said lowered position, said hitch arm further having a flexible connector in proximity to said at least one bracket for removably attaching said bicycle hauler to a seat post of a bicycle when said hitch arm is in said forward position and said first and second wheels are in said downward position whereby said bicycle hauler can be towed by said bicycle; and
   (e) coupling means secured to said bottom of said frame for removably attaching said bicycle hauler to a corresponding receiver on a motor vehicle.

5. The bicycle hauler of claim 4 wherein said flexible connector comprises a ball joint.

6. The bicycle hauler of claim 4 wherein said hitch arm comprises at least two adjustable brackets.

7. The bicycle hauler of claim 6 wherein said brackets can be adjusted so as to be usable as handles to manually pull said bicycle hauler when said first and second wheels are in said downward position and said hitch arm is in said forward position.

\* \* \* \* \*